(12) United States Patent
Leech

(10) Patent No.: US 11,470,809 B2
(45) Date of Patent: Oct. 18, 2022

(54) LITTER SCOOPING RECEPTACLE

(71) Applicant: James Leech, Richmond (CA)

(72) Inventor: James Leech, Richmond (CA)

( * ) Notice: Subject to any disclaimer, the term of this patent is extended or adjusted under 35 U.S.C. 154(b) by 140 days.

(21) Appl. No.: 17/145,207

(22) Filed: Jan. 8, 2021

(65) Prior Publication Data

US 2022/0217937 A1 Jul. 14, 2022

(51) Int. Cl.
*A01K 1/01* (2006.01)

(52) U.S. Cl.
CPC ............ *A01K 1/011* (2013.01); *A01K 1/0114* (2013.01)

(58) Field of Classification Search
CPC .............................. A01K 1/0114; A01K 1/011
See application file for complete search history.

(56) References Cited

U.S. PATENT DOCUMENTS

| | | | |
|---|---|---|---|
| 6,332,429 B1 * | 12/2001 | Gramlich | A01K 1/0107 119/165 |
| 6,568,348 B1 | 5/2003 | Bedard | |
| 7,017,519 B1 | 3/2006 | Deasy et al. | |
| 7,128,022 B2 | 10/2006 | Parr | |
| 8,356,845 B2 * | 1/2013 | Bernard | A01K 1/0114 294/1.3 |
| 8,408,614 B2 * | 4/2013 | Lipscomb | A01K 1/0114 294/1.3 |
| 9,565,831 B1 * | 2/2017 | Coscia | A01K 29/00 |
| 10,869,458 B1 * | 12/2020 | Kiser | A01K 1/011 |
| 11,297,795 B2 * | 4/2022 | LaBounty | A01K 1/0107 |
| 2008/0149036 A1 * | 6/2008 | Emery | A01K 1/0114 119/166 |

* cited by examiner

*Primary Examiner* — Yvonne R Abbott-Lewis

(57) ABSTRACT

One embodiment of a scooping litter receptacle, which forms a compact cylindrical exterior design, includes a scooping device that can move within a litter filled channel inside a base container. The scoop is able to pass through the entire bed of litter granules, thus, separating waste material from usable litter. The scoop can then be lifted from the litter receptacle by the handle so that the complete scooping process can be done by the user without the user coming into contact with parts that have traversed through the soiled litter mass. Also, the scooping device is not fixed to the base container which makes it easy to remove and discard the waste as well to remove for cleaning. Further, the base container is designed such that the scooping device can be stored on the outside of the litter receptacle. An optional top cover allows for the litter receptacle to be enclosed which helps reduce litter tracking outside the litter receptacle as well as providing a compact and tidy appearance.

20 Claims, 15 Drawing Sheets

LITTER SCOOPING RECEPTACLE

BACKGROUND OF THE INVENTION

1. Field of the Invention

The present invention relates to cat litter apparatus, and more particularly, to an easy cleaning and efficient sifting litter box system.

2. Description of the Prior Art

Traditionally, indoor cats are trained to use a litter box for performing their bodily functions. The typical litter box consists of a container made from a material such as plastic, which holds granular absorbent material called litter. Many forms of litter clump when absorbing liquids, thus containing the urine in clump form. To maintain a clean litter box as well as reduce unpleasant odors, it is necessary to frequently separate and dispose of the urine clumps and fecal matter from the usable litter. This task is seen most often as unpleasant and thus, many devices have been developed to automate the process.

A common method that has been invented to make cleaning a litter box an easier task is gravitational sifting. Two different automated sifting methods have been disclosed in patents U.S. Pat. Nos. 7,647,889 and 6,463,881 where the container holding the litter is rotated such that the clean litter will flow with gravity through a screen that separates small litter granules from the larger waste excreta. Sifting systems such as these have some disadvantages. The method of displacing all the litter through a screen causes soiled litter dust to be raised into the air; further to this, the volatile action of displacing all the litter through a screen often causes softer litter clumps to break apart into small pieces and thus rendering the sifting screen unable to separate these smaller pieces from usable litter.

Another self-cleaning litter method is raking. U.S. Pat. No. 9,526,226 describes a rectangular litter box which uses a motorized rake to extract waste from the litter. There are some disadvantages related to such raking systems. Only certain litter types that sift easily can be used in these systems. The rake horizontally traverses the litter bed and litters that are more difficult to sift form a wave in front of the rake resisting the sifting process. Further to this, cats frequently urinate on the edges of litter systems and in my observation, these systems tend to clog and jam under such circumstances where a clump is formed in key areas along edges and corners.

U.S. Pat. Nos. 7,128,022, 6,568,348, and 7,017,519 describe circular litter receptacles that hold a mass of litter granules and comprise varying mechanisms for rotating a grate through the circular litter receptacle holding litter granules. In U.S. Pat. No. 7,128,022 the mechanism for sifting is a scoop holder that attaches to a top rim of the litter receptacle and the scoop holder is configured for movement around the top rim such that a scoop can be inserted into scoop holder and guided through the litter granules, and then detached from the scoop holder for disposal of any sifted refuse; in U.S. Pat. No. 6,568,348 the mechanism for sifting is a rake which is rotated relative to the central point in the litter receptacle, such that when the grate is rotated it will sift through the litter granules and separate refuse; lastly, in U.S. Pat. No. 7,017,519, the sifting mechanism is a rake that rotates around the center point of the litter receptacle and includes sensors and automation so that the litter receptacle will automatically detect when a cat has excreted in the litter receptacle, and then engage a cleaning cycle. Raking circular litter receptacles such as the three mentioned above have some disadvantages; the components required to facilitate sifting add complicated bulkiness to the litter systems, encroach on the usable litter surface for a feline, and provide ideal locations for bacteria to grow.

BRIEF SUMMARY OF THE INVENTION

There are three main objectives this invention intends to fill. The first is to effectively and reliably sift the entire litter material along a controlled and defined pathway. The second objective of this invention is to shrink the design footprint of self-scooping or easy cleaning litter boxes to allow for aesthetically pleasing and compact litter box designs while maximizing the usable space for felines. The last objective of this invention is to create a receptacle that will function with both an open container design as well as a top cover that can be used to contain litter within the litter receptacle.

The present disclosure provides a litter box design that efficiently filters waste material in a simple compact design. The litter box receptacle includes a base container which holds a mass of litter and a removable scooping device designed to engage with the base container. The scooping device has a handle on one end and a sifting grate on the other end; further the scooping device is shaped such that its body substantially conforms in shape to the internal litter holding area of the base container.

The inner surface of the base container is formed with a circular bottom, an outer sidewall encircling the outside perimeter of the bottom, and an inner sidewall raising up from the bottom, and centered within the outer sidewall. A landing pad surface is formed substantially inside the top perimeter of the inner sidewall. The area bound between the bottom and outer and inner sidewalls forms a litter channel with no sharp edges or corners, and this litter channel holds a mass of litter; the landing pad, located in the center of the litter channel, provides a stable surface for felines to step onto while entering, exiting or moving around inside the litter receptacle. As the feline makes use of the device, the excreta are deposited throughout the mass of litter. A feature of this base unit is it has no sharp corners or edges and thus, there are limited areas for clumps to become lodged, stuck or smeared upon. The scooping device is designed such that it can be inserted into the base container and moved along the litter channel, guided between the inner and outer sidewalls, and then lifted from the base container to dispose of any sifted excreta.

The scoop consists of a handle attached to a scooping profile and a sifting grate attached inside of the scooping profile perimeter. Further, the scooping profile perimeter is substantially contoured to the litter channel; when the scoop is moved along the litter channel, the sifting grate allows clean litter granules to pass through while larger excreta particles will be separated.

As another feature of this invention, is the outer surface can be manufactured in a way that allows a top cover to slide over the base container and enclose the litter box. There are many benefits to an enclosed litter box, the main one being litter scatter control. The cover described in this invention will stack on top of the base container. This will allow the cover to secure onto the base unit. The feline will enter and exit the receptacle through an access hole on the cover's top surface. Upon exiting, the feline will climb out of the unit which will help remove litter particles from their paws, thus keeping as much litter material as possible from spreading beyond the litter receptacle.

BRIEF DESCRIPTION OF THE SEVERAL VIEWS OF THE DRAWINGS

Other features and advantages of the present invention will become apparent when the following detailed description is read in conjunction with the accompanying drawings, in which:

FIGS. 8A-10A are cross sectional views of FIGS. 8-10. These cross section views illustrate operation in better clarity and detail.

DETAILED DESCRIPTION OF THE PREFERRED EMBODIMENT

The following description is provided to enable any person skilled in the art to make and use the invention and sets forth the best modes contemplated by the inventor of carrying out their invention. Various modifications, however, will remain readily apparent to those skilled in the art, since the general principles of the present invention have been defined herein to specifically provide a litter scooping receptacle.

Figure 2:
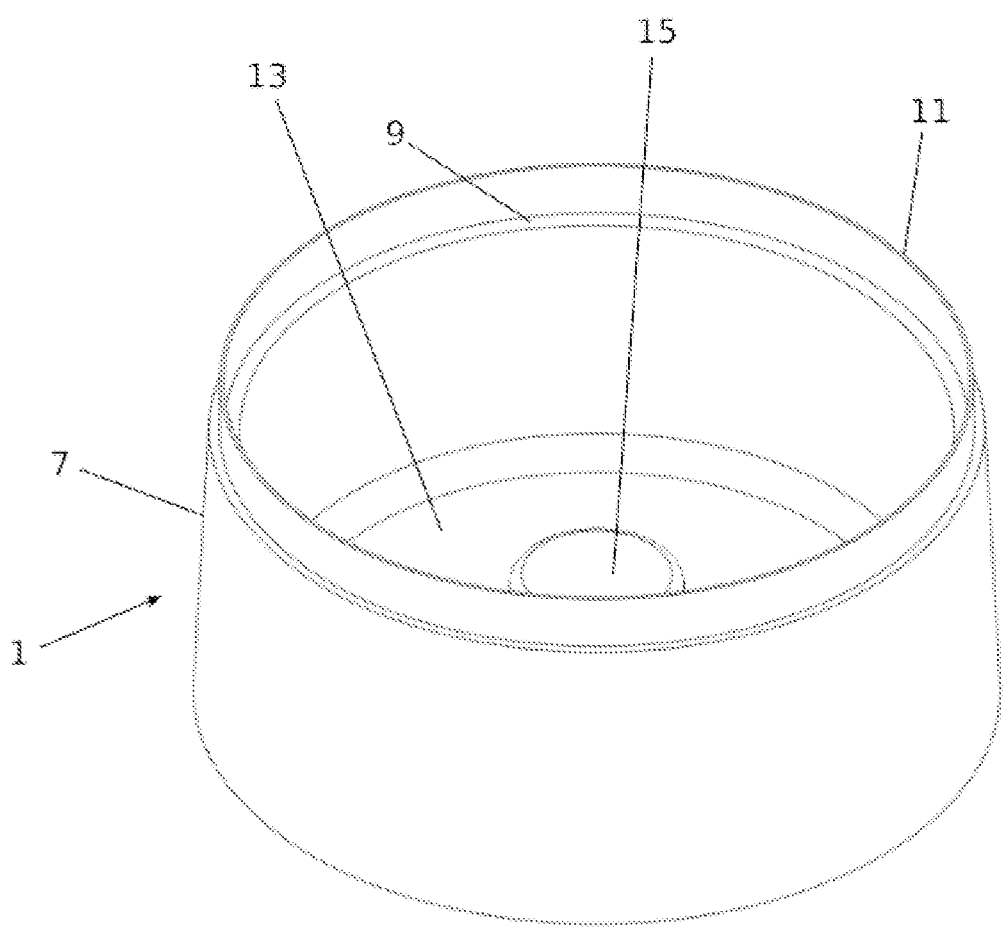
FIG. 2 depicts an isometric view of one embodiment of a base container.
Figure 3A:
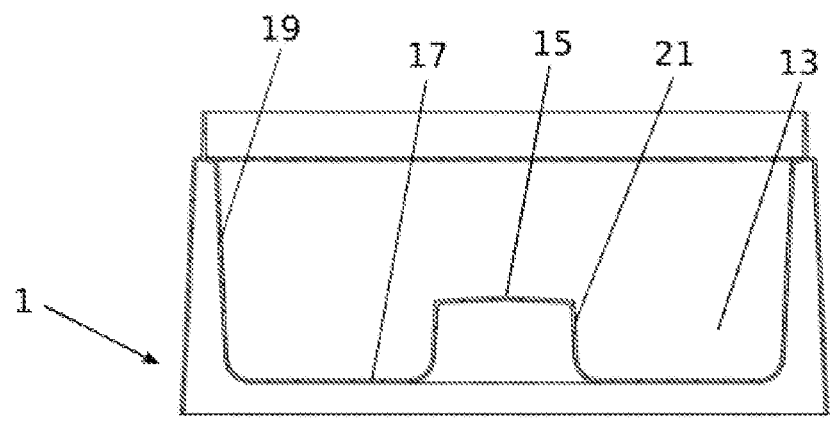
FIG. 3a depicts a cross sectional view of FIG. 3 along line A-A.
Figure 3:
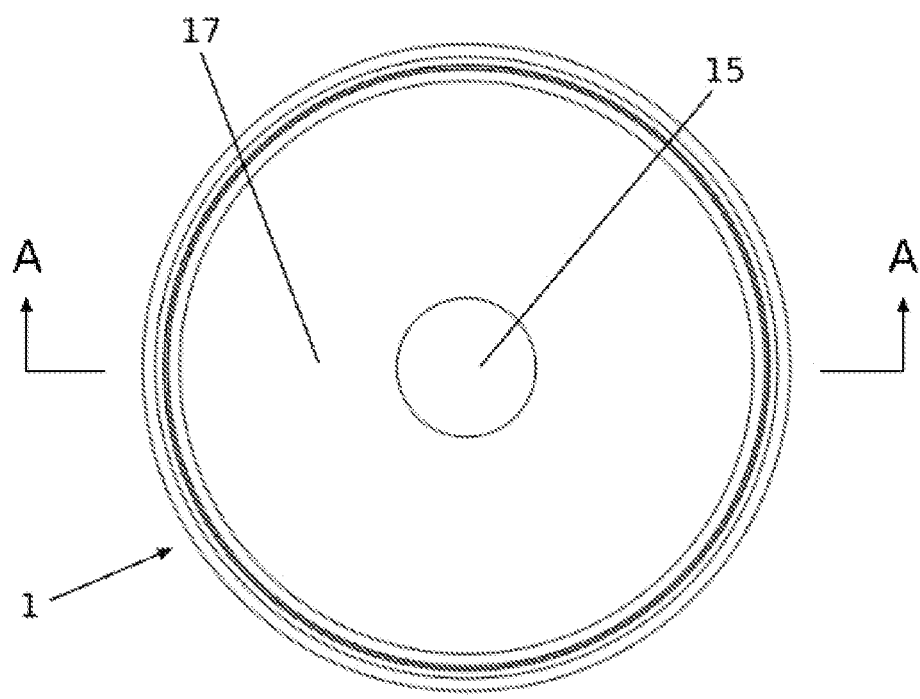
FIG. 3 depicts a top view of one embodiment of a litter receptacle.
Figure 13:
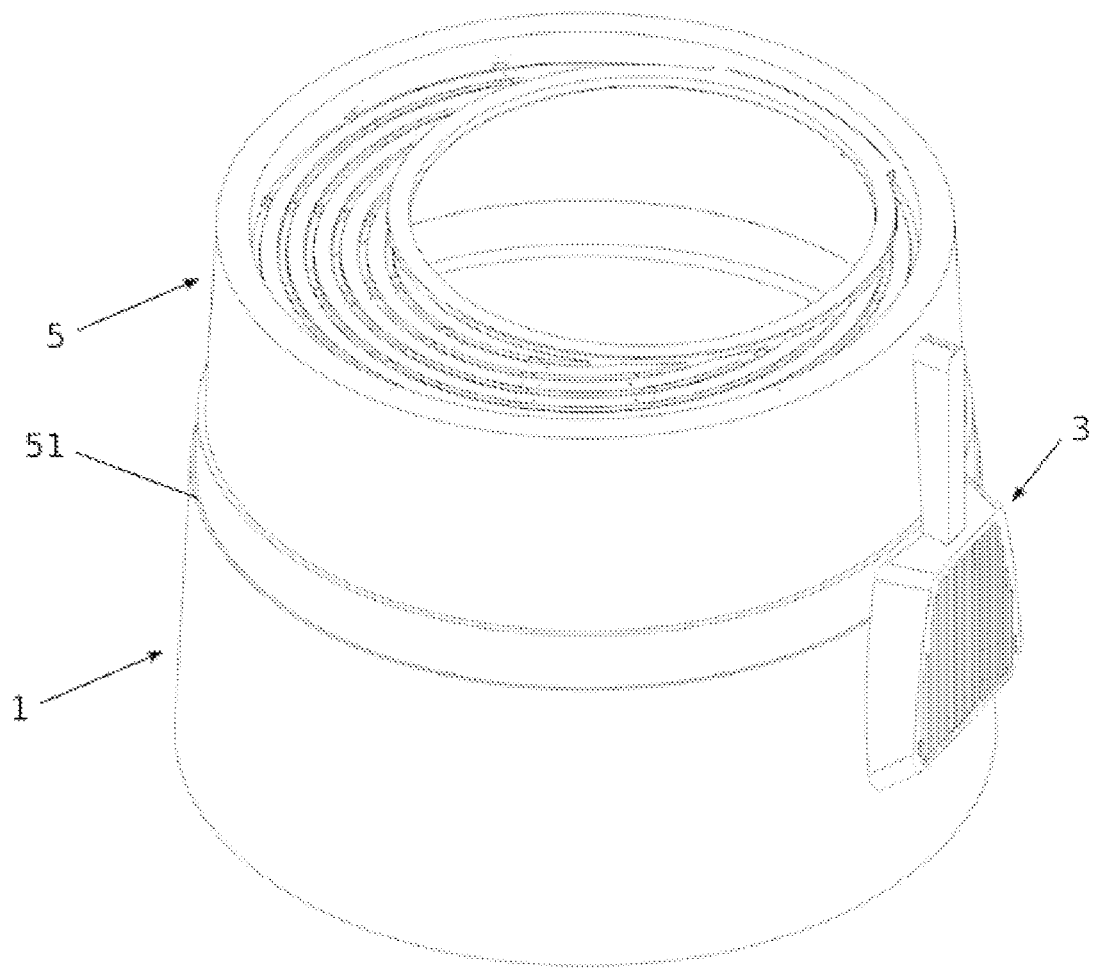
FIG. 13 depicts an isometric view of one embodiment of the assembled litter receptacle comprising of a scooping device, base container, and top cover.

One embodiment of the litter receptacle is shown in FIG. 13 and comprises a base container 1, scooping device 3, and top cover 5. Referring to FIG. 2 the base container 1 of this embodiment is illustrated and features a substantially cylindrical exterior wall 7 and inner surface 9. The exterior wall 7 and inner surface 9 are attached along a top edge 11. The inner surface 9 features a litter channel 13 and a landing pad 15. Referring to FIG. 3A which is a cross section of the base container in FIG. 3 along line A-A, the litter channel 13 has a disc shaped bottom 17 with an outer sidewall 19 encircling the bottom 17 and an inner sidewall 21 centered within the perimeter of the outer sidewall 19. The inner sidewall 21 extends upwards from the bottom 17 and connects to the landing pad 15. The litter channel 13 forms a continuous loop without sharp edges or corners and is configured to retain a bed of litter granules. A suitable height for the inner sidewall 21 could be 50-100 MM, which is a range similar to the typically recommend fill depth for most types of cat litter. A suitable radius for the landing pad 15 would be 35-75 MM and a suitable radius for outer sidewall 19 could be 200-300 MM. The base container 1 may be made of a plastic such as polypropylene, acrylonitrile butadiene styrene, polystyrene, or any of the numerous other similar plastics or even metals. Further, the base container 1 of this embodiment may be manufactured using a several suitable methods, a few of which are plastic injection molding, thermoforming, and metal stamping.

Figure 1:
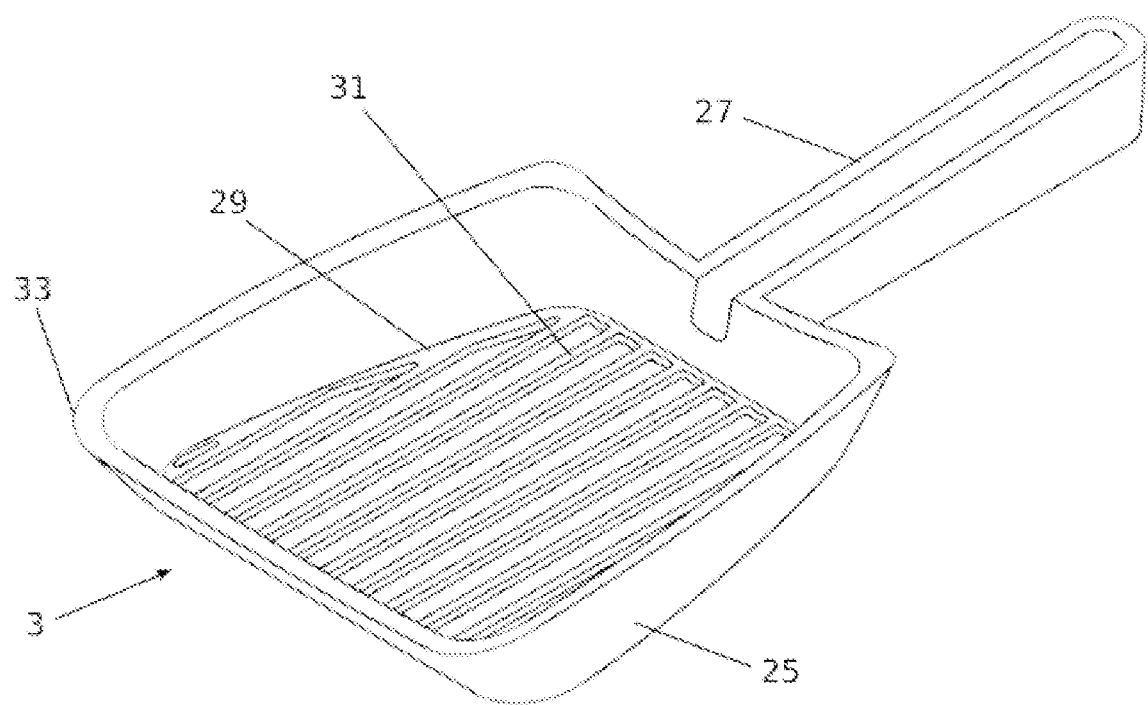
FIG. 1 depicts an isometric view of one embodiment of a scooping device.
Figure 4:
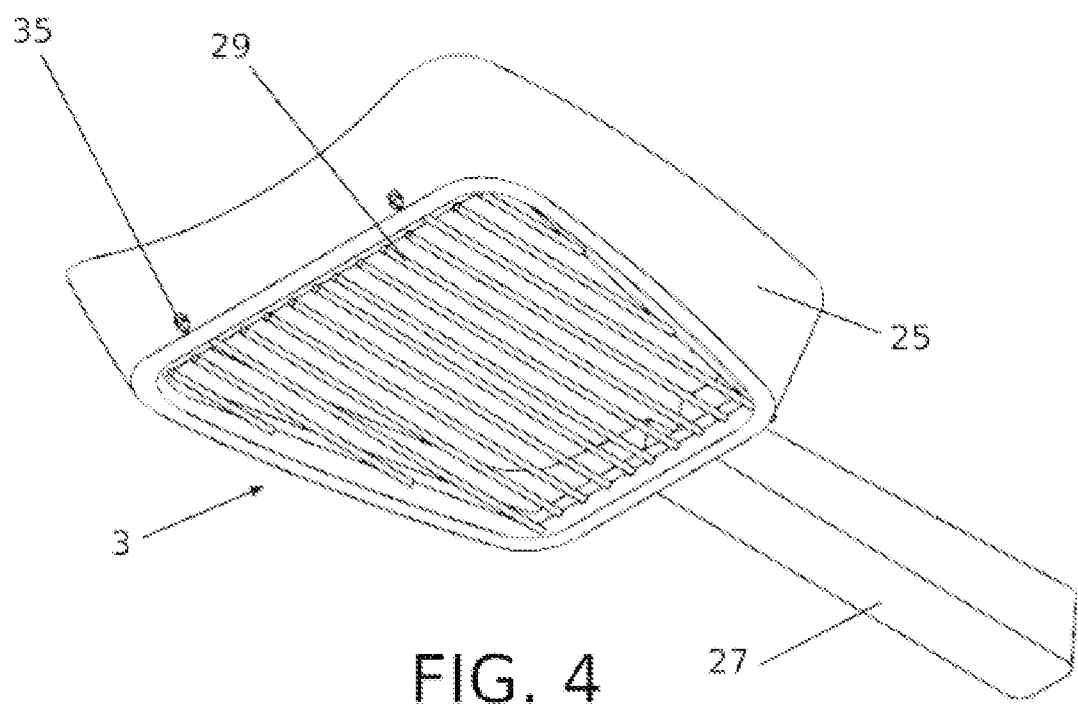
FIG. 4 depicts an isometric view of an embodiment of a scooping device with a separate sifting grate.

Referring to FIG. 1 a scooping device 3 of this embodiment is depicted. The scooping device 3 is comprised of several components; a scooping profile 25, handle 27, and sifting grate 29. The scooping profile 25 forms a perimeter that substantially contours the litter channel 13 of the base container 1 from FIG. 2, and the sifting grate 29 is configured within said perimeter. Said sifting grate 29 is comprised of several tines 31, arranged in a pattern that allow litter granules to pass through the sifting grate 29 while restricting waste excreta, thus, said sifting grate 29 is capable of separating waste excreta from a bed of litter granules. In this embodiment several tines 31 are arranged parallel to each other. The sifting grate 29 and scooping profile 25 are configured together to form a cupped shape capable of holding waste excrete after separation. A scooping edge 33 is formed around the perimeter of the scooping profile 25. In this embodiment the scoop profile 25, handle 27, and sifting grate 29 may all be constructed from a singular piece of material, such as polypropylene, acrylonitrile butadiene styrene, nylon, aluminum or steel. A suitable process for manufacture could be injection molding or die casting. Alternatively, the scooping profile 25, handle 27 and sifting grate 29 could be separate components that are assembled to form the scooping device 3, or produced in a process such as insert molding where different materials can be injection molded together. For example, in FIG. 4, the handle 27 and scooping profile 25 are constructed from a single piece of material, and the sifting grate 29 is a separate component that is press fit into a series of mounting holes 35 on the scooping profile 25.

Figure 5A:
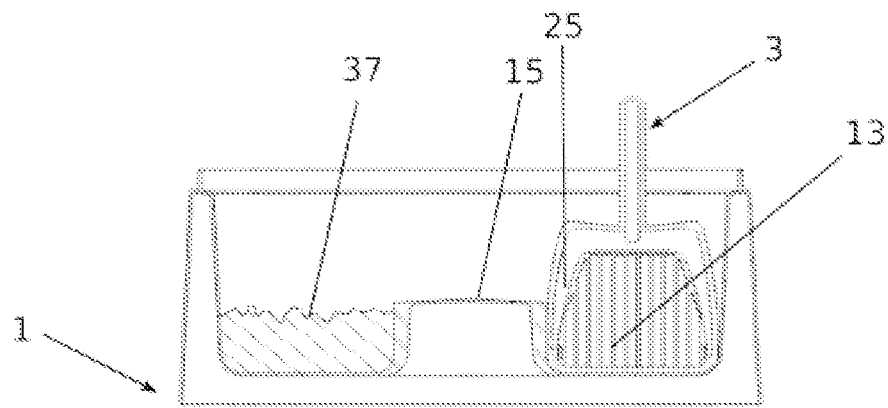
FIG. 5A depicts a cross sectional view of FIG. 5 along line B-B.
Figure 5:
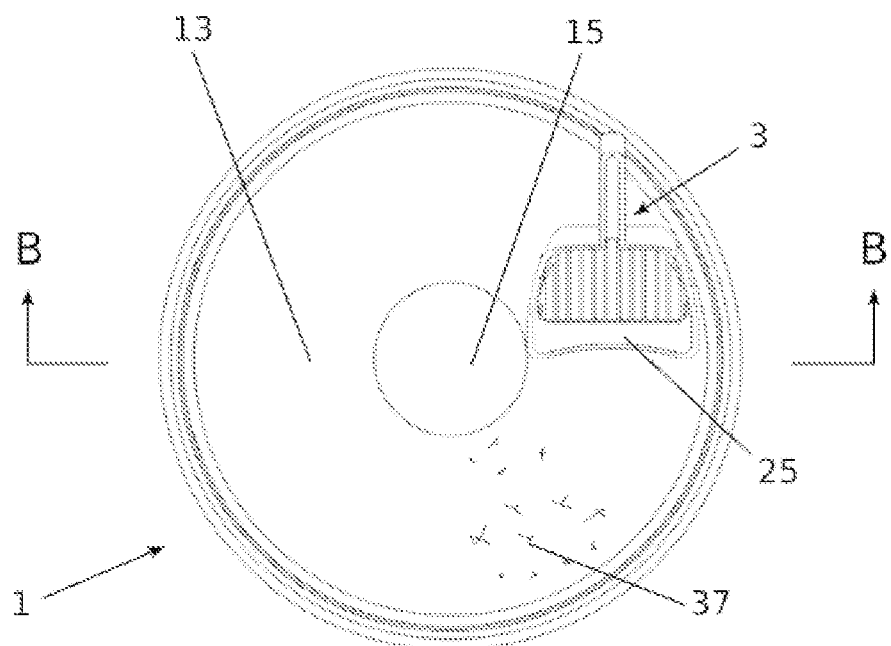
FIGS. 5-10 depict top views illustrating the operation of one embodiment of the litter receptacle. The scooping device is being rotated through a litter channel inside a base container and then lifted from said base container.
Figure 6:
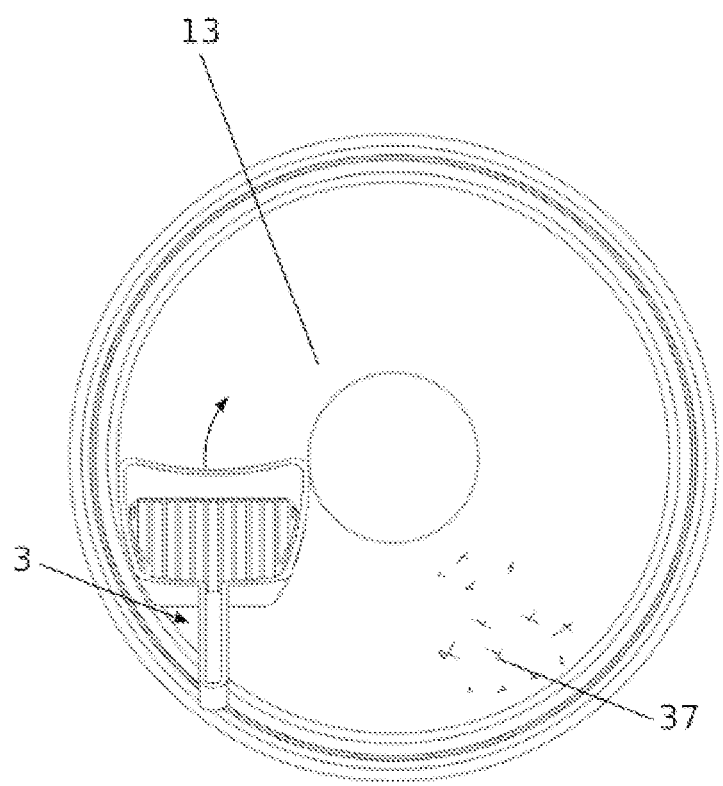
Figure 7:
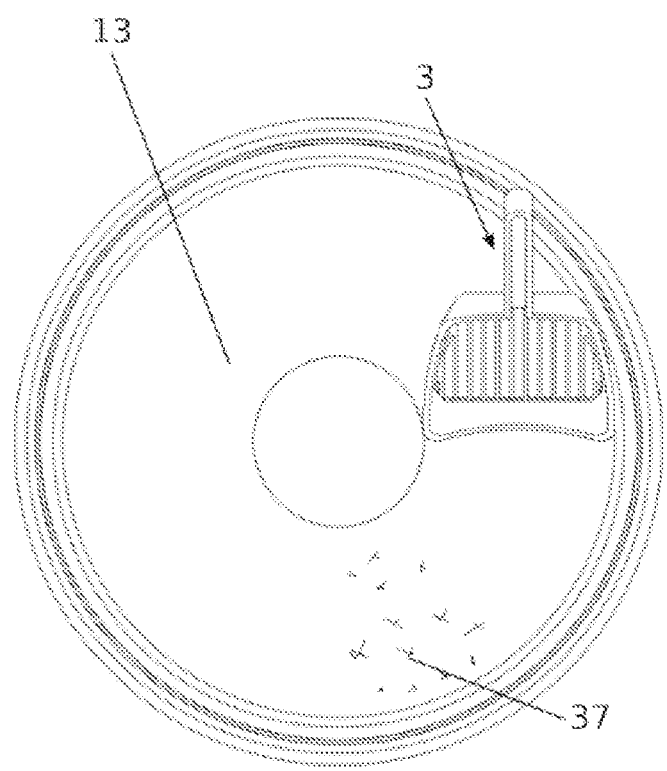

The operation of the above described embodiment is illustrated in FIGS. 5-10. FIG. 5 shows a top view of the base container 1 with the scooping device 3 inserted into the base container 1 and FIG. 5A is a cross section of FIG. 5 along line B-B. The litter channel 13 contains a bed of litter granules 37. The scooping profile 25 features a substantially matching contour to the litter channel 13. Further, the landing pad 15 has a central position within the bed of litter granules 37, so a feline can step onto said landing pad while entering, exiting or moving inside the base container 1, thus, the landing pad 15 provides a stable surface for the feline's paws. Referring to FIG. 5A, a cross sectional view of FIG. 5 is shown. The litter channel 13 of the base container 1 is holding the bed of litter granules 37. The Scooping device 3 has been inserted into the contoured litter channel 13 of the base container 1, and the scooping profile 25 is making contact with the bottom 17 of the base container 1. This is a starting position for a scooping cycle, where the scooping device 3 will be moved along the litter channel 13 and thus, through the litter bed 37, separating any waste excreta from the bed of litter granules 37. In FIG. 6 the scooping device 3, is in motion and has been rotated by manual force 180 degrees along the litter channel 13 to a point where said scooping device 3 has traversed half of the bed of litter granules 37. In FIG. 7, the scooping device 3 has traversed 360 degrees along the litter channel 13, relative to starting position of the scooping cycle. At this point, the scooping device 3 has now traversed the entire litter channel 13. To account for any litter granules 37 that may have been urged forward in a wave in front of the scooping device 3, the scooping device 3 is moved an additional 90 degrees along the litter channel 13; in FIG. 8, the scooping device 3 has now been rotated a full 450 degrees relative to the starting position of the scooping cycle, whereby said sifting grate 29 will have separated any waste excreta 39 from the bed of litter granules 37.

Figure 8A:
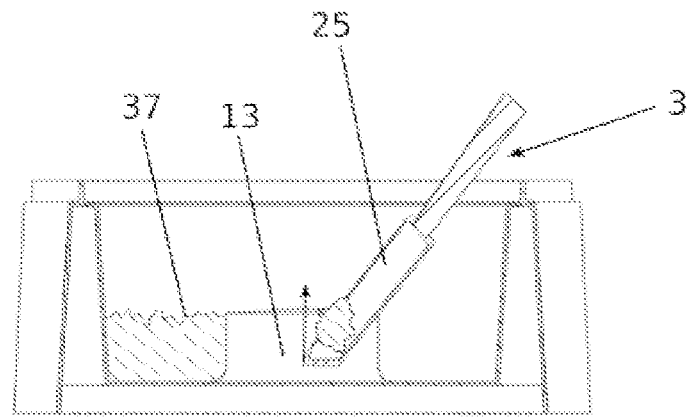
Figure 8:
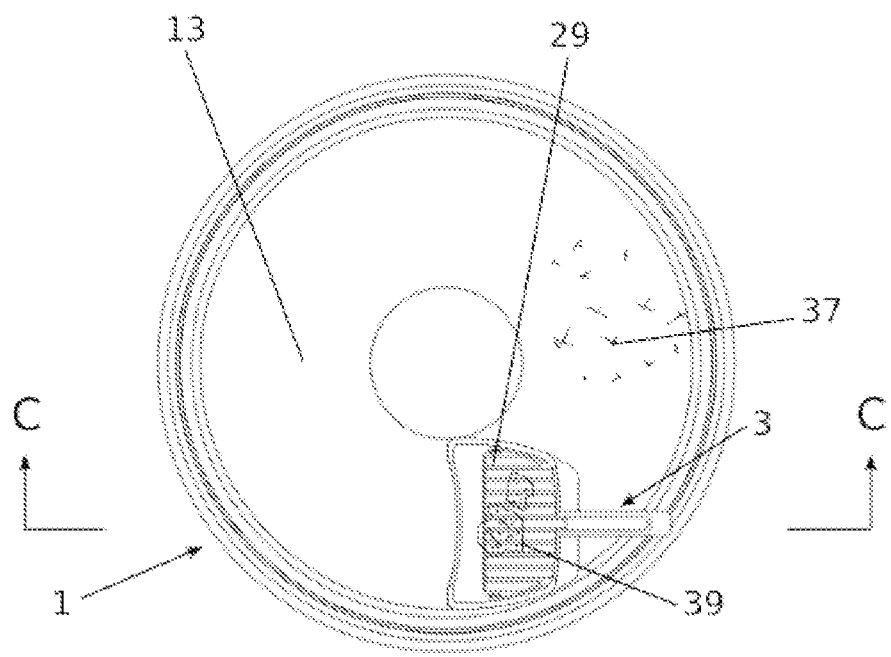
Figure 9A:
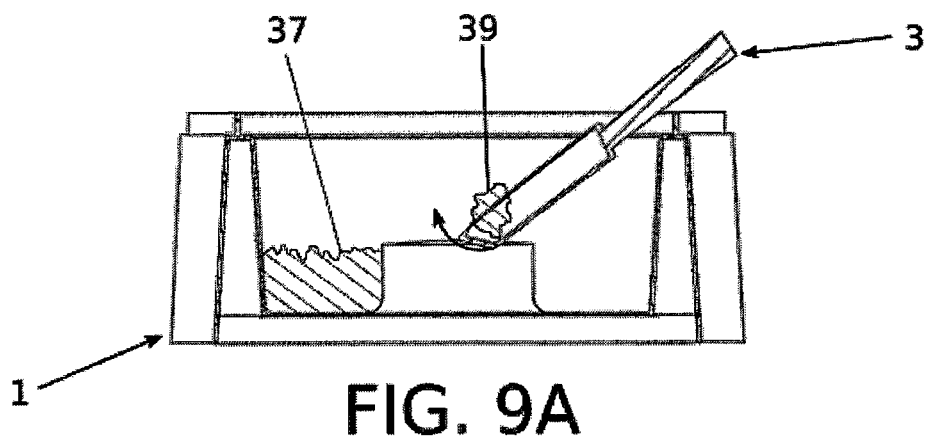
Figure 9:
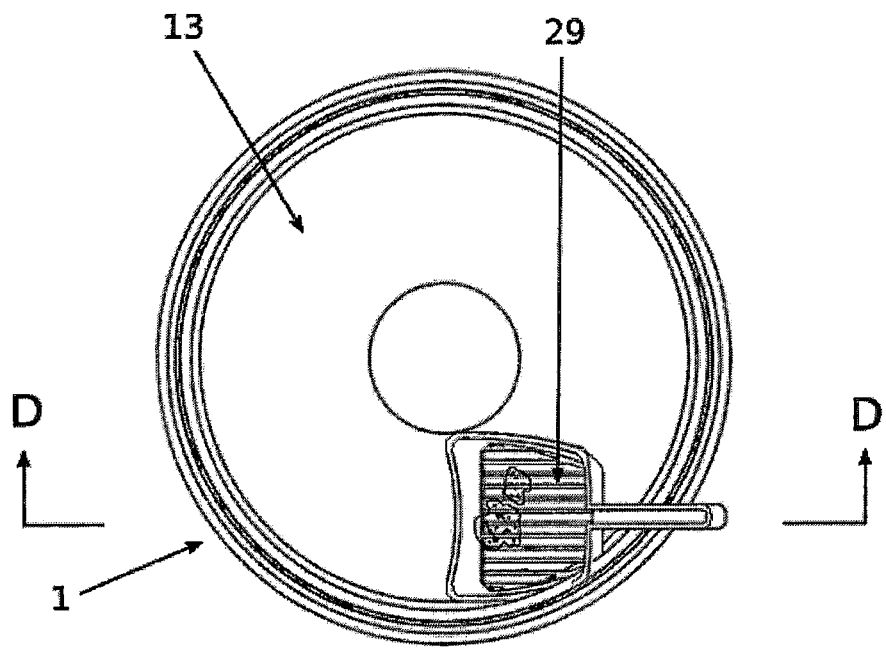
Figure 10A:
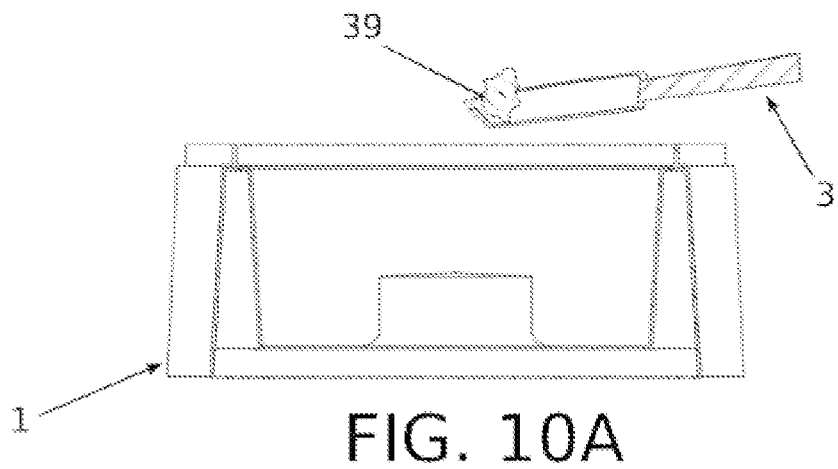
Figure 10:
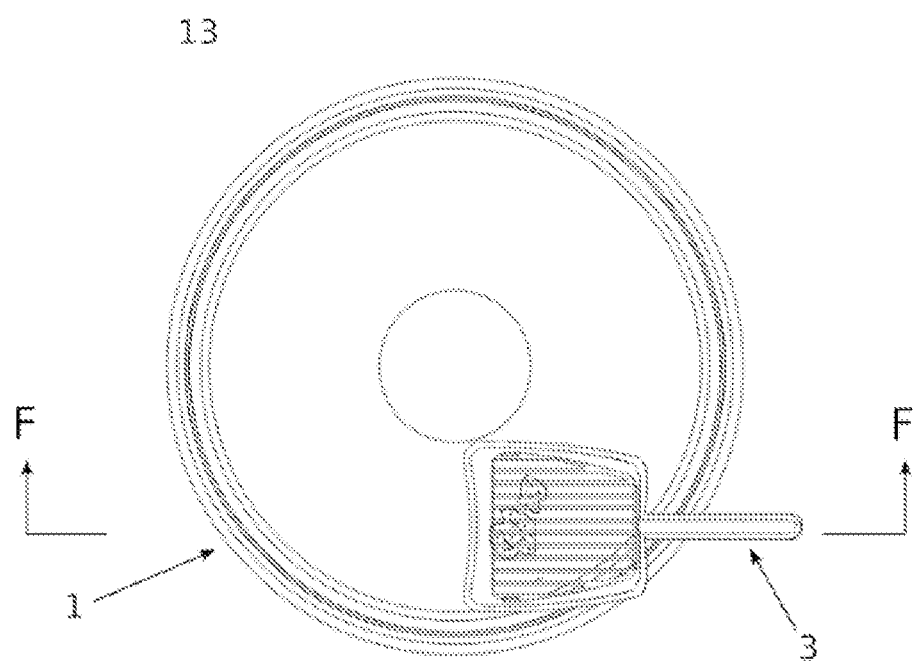

FIGS. 8-10, and their respective cross sections FIGS. 8a-10a, illustrate lifting the scooping device 3 from the litter channel 13. Because the scooping profile 25 is substantially contoured to the litter channel 13, the scooping device 3 is first lifted straight upwards as shown in FIG. 8A, which creates a gap between the scooping profile 25 and litter channel 13, thus allowing the scooping device 3 to be tilted horizontally. In FIG. 9A, the scooping device 3 is being tilted horizontally to ensure the waste excreta 39 is contained within the scooping device 3 while the scooping device 3 is lifted from the base container 1. In FIG. 10A, the scooping device 3 has now been fully lifted out of the base container 1 and contains the waste excreta 39 which can now be disposed of in a suitable waste receptacle. It is important to note that the scooping device 3 is not mechanically attached to the base container 1 and therefore the scooping device 3 can be lifted out of the base container 1 at any point during the scooping cycle.

Figure 11:
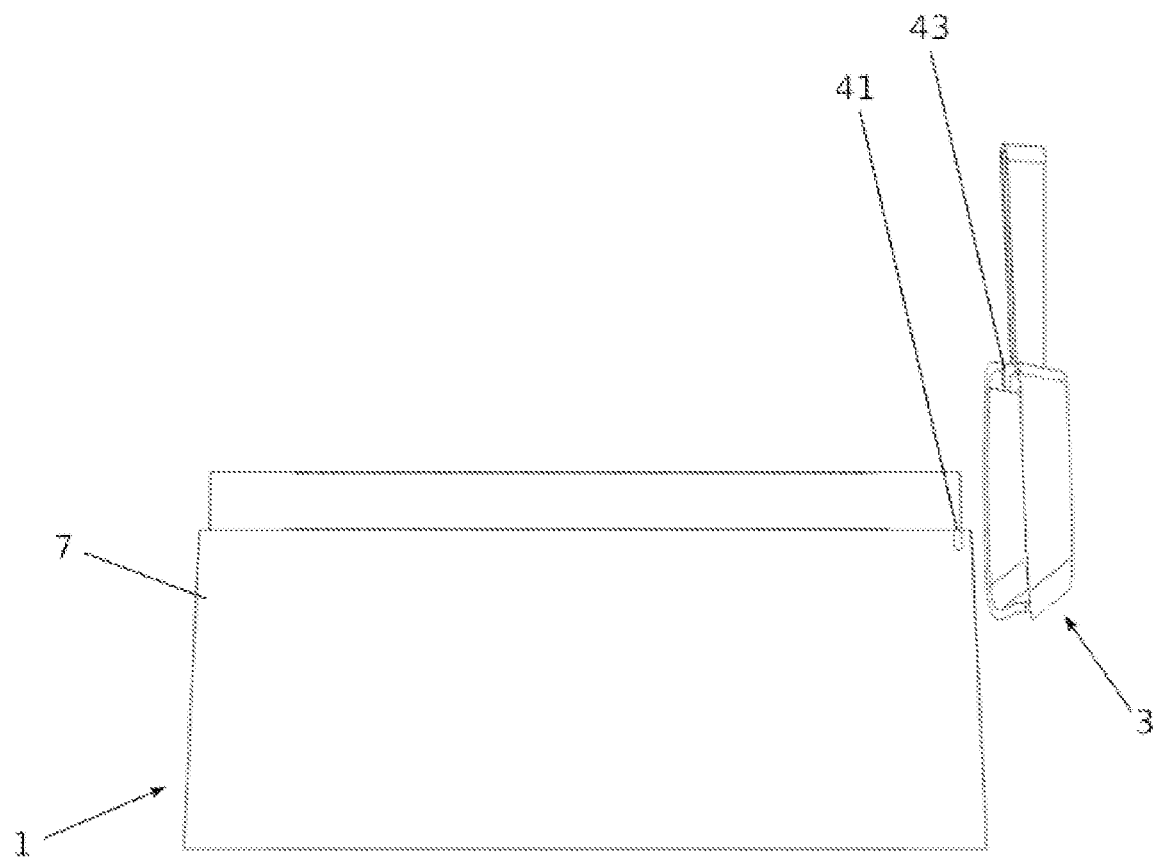
FIG. 11 depicts a side view which illustrates mechanisms for mounting a scooping device to the outside of a base container.

As an added feature to this embodiment, the scooping device 3 can be mounted outside the base container 1 for storage, as illustrated in FIG. 11. A mount slot 41 is indented into the exterior wall 7 of the base container 1 such that a hook 43 on the scooping device 3 can be inserted into the mount slot 41 for tidy and secure storage of the scooping device 3 while not in use.

Figure 12:
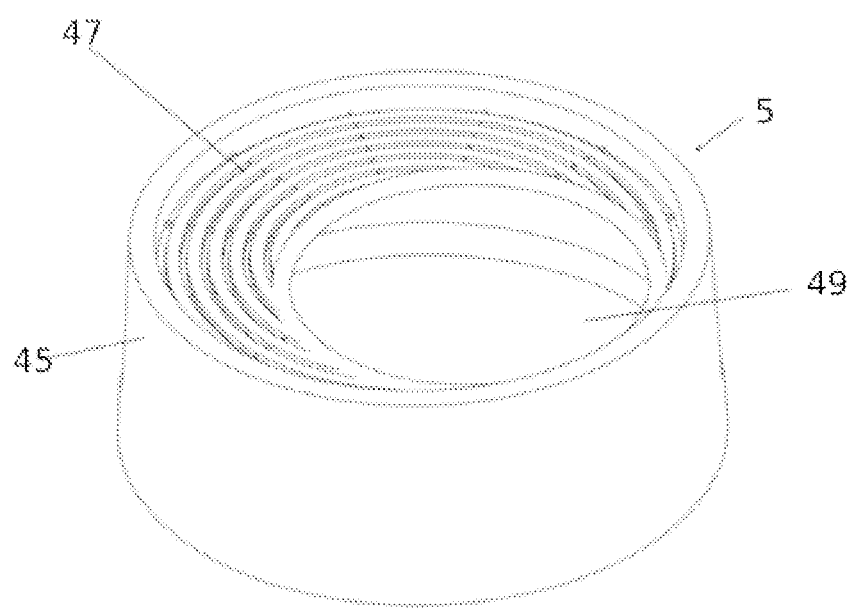
FIG. 12 depicts an isometric view of a cover.

Referring to FIG. 12 a top cover 5 is illustrated for the above described embodiment. The top cover 5 is comprised of cylindrical side walls 45, a roof membrane 47, and an ingress-egress opening 49. In FIG. 13 the first embodiment is illustrated with base container 1, scooping device 3, and top cover 5 assembled creating a compact, tidy, and modern appearance as well as helping contain litter and odor within the litter receptacle. The base container 1 has an indented ridge 51 and the cover 5 is adapted so it securely rests on this indented ridge 51.

Figure 14:
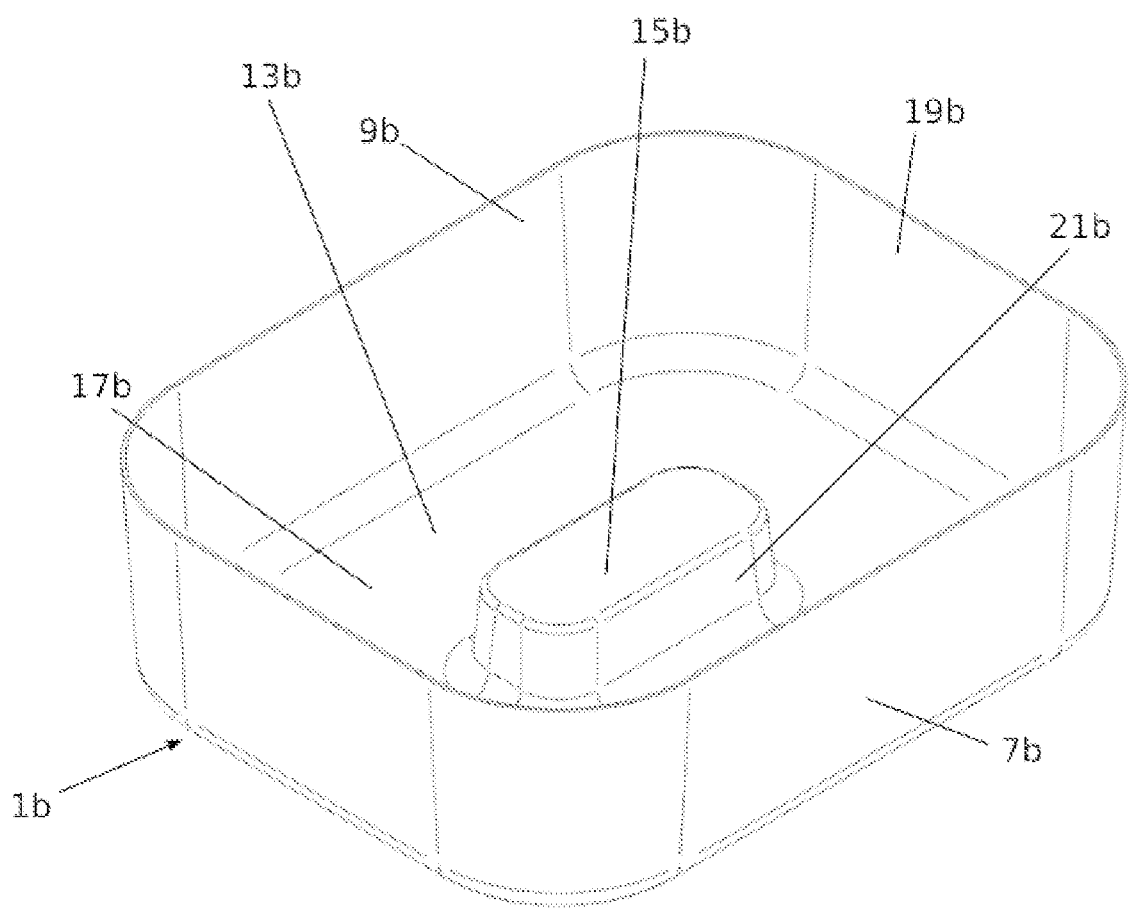
FIG. 14 depicts an isometric view of another embodiment of a base container.

Another embodiment of the litter receptacle is shown in FIG. 14. This embodiment of a base container 1b is similar to the above described embodiment, with the following differences: a bottom 17b is rectangular in shape, whereas the bottom 17 from the embodiment in FIG. 2 is a circular disc shape. An outer sidewall 19b and inner sidewall 21b are of rectangular shape, whereas the outer sidewall 19 and inner sidewall 21 from the embodiment in FIG. 2 are cylindrical in shape. In this embodiment, a litter channel 13b is formed with straight lines and bends, as opposed to the litter channel 13 from the embodiment in FIG. 2, which is a substantially round loop. Further, unlike the base container 1 depicted in FIG. 2 which utilizes a double wall structure with an exterior wall 7, inner surface 9, and top edge 11, this embodiment simply has one structured wall with an exterior surface 7b and an interior surface 9b.

Figure 15:
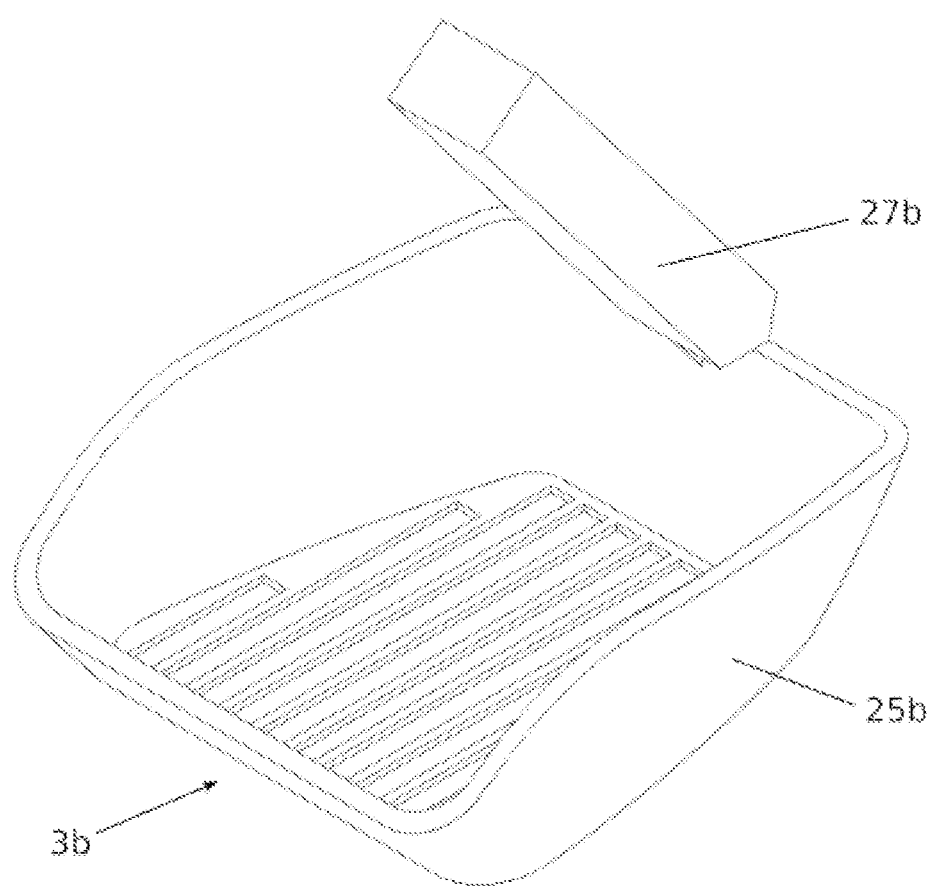
FIG. 15 depicts an isometric view of another embodiment of a scooping device.

In other embodiments a scooping device could be formed in a plurality of differently ways; for example, in FIG. 15 a scooping device 3b is formed with a handle 27b on top of a scooping body 25b. Further, the sifting grate 29 can be formed from a variety of materials and in a variety of configurations; for example, it could be constructed from mesh or netting.

From the above description, a number of advantages of my litter scooping receptacle will become evident. The litter is able to be fully sifted in a defined pathway, allowing for more thorough and predictable sifting, and the scooping device can be removed from the base container without the user touching any component that has been in contact with used litter. Because the scooping device is easily removable, it can be lifted from the litter channel at any point during the scooping cycle and if the litter material is excessively soiled, the scooping cycle can be accomplished in a piecemeal process. Further, this invention can be designed without any mounted internal components that encroach on a felines usable space, which allows a very efficient throughput between the external and internal footprint of the litter receptacle. Another advantage is the landing pad which provides stability to a felines' paws. Typically, litter granules are a loose material that offer little stability; it is beneficial in litter systems to have relatively deep litter to help absorb urine, but many cats are uncomfortable in deep litter as their paws sink, especially if they are entering and exiting the litter box from a height above the bed of litter granules. Also, the designs in the above mentioned embodiments allow a top cover to be added to the base container; this is desirable in litter and odor containment, and because the unit can be used with or without the top cover, a feline can slowly be introduced to the covered litter system without any stressful and sudden transition.

The description above describes multiple embodiments of the litter receptacle in details with many specificities. These specificities are provided to clearly illustrate some of the embodiments but the scope of these embodiments is not limited to these specificities. For example, the base container could feature outer walls that differ in shape from cylindrical, for instance the outer walls could be a plurality of shapes such as oval or rectangular; the cover could be secured to the base container differently such as using a latch, overlapping interference fit, or a plethora of other configurations. How the cover attaches to the base container is trivial.

For these reasons, the scope of the above described embodiments should be determined by the appended claims, instead of the examples given. Although the invention has been described in considerable detail in language specific to structural features and or method acts, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) are not used to show a serial or numerical limitation but instead are used to distinguish or identify the various members of the group.

What is claimed is:

1. A litter scooping receptacle comprising:
a base container having an inner surface, the inner surface includes a litter channel, said litter channel having a bottom, an outer sidewall encircling said bottom, and an inner sidewall positioned within the perimeter of said outer sidewall, said litter channel configured to retain a bed of litter granules;
a removable scooping device engaged with the litter channel, the removable scooping device having a sifting grate conforming to the litter channel such that upon movement of the removable scooping device through the bed of litter granules, the sifting grate is configured to retain sifted waste material; and,
the removable scooping device configured to be removed from the base container for disposing the retained sifted waste material from the sifting grate.

2. The litter scooping receptacle of claim 1, wherein the base container includes a landing pad adapted substantially within the perimeter of the inner sidewall, said landing pad configured to support an adult feline.

3. The litter scooping receptacle of claim 1, wherein the litter channel forms a continuous loop, whereby, the scooping device can be moved through the entire litter channel in one continuous motion.

4. The litter scooping receptacle of claim 1, wherein the removable scooping device includes a handle configured to facilitate the movement of the removable scooping device by a user.

5. The litter scooping receptacle of claim 1, wherein the base container has a substantially cylindrical exterior wall and the inner surface has a substantially cylindrical outer sidewall and a substantially cylindrical inner sidewall substantially centered within the perimeter of said outer sidewall.

6. The litter scooping receptacle of claim 1, wherein the base container has a substantially rectangular exterior wall and the inner surface has a substantially rectangular outer sidewall and a substantially rectangular inner sidewall substantially centered within the perimeter of said outer sidewall.

7. The litter scooping receptacle of claim 1, wherein the scooping device includes a scooping profile, a separable sifting grate, and means to attach said separable sifting grate within the perimeter of said scooping profile.

8. The litter scooping receptacle of claim 1, wherein the base container is upwardly open to an environment.

9. The litter scooping receptacle of claim 8, further comprising an enclosure cover having a singular ingress and egress opening, wherein the enclosure cover is mountable to the base container.

10. The litter scooping receptacle of claim 1, wherein the base container includes an exterior wall, said exterior wall comprising a mount slot configured to engage a mount hook on the removable scooping device such that the scooping device can be mounted to the base container in a fixed position.

11. The litter scooping receptacle of claim 1, wherein the sifting grate is comprised of a plurality of tines arranged in a pattern enabling litter granules of the bed of litter granules to pass through the sifting grate while restricting waste material.

12. A litter scooping receptacle comprising:
a base container having an inner surface, the inner surface includes a litter channel, said litter channel having a bottom, an outer sidewall encircling said bottom, and an inner sidewall substantially centered within the perimeter of said outer sidewall, wherein the litter channel forms a continuous loop, said litter channel configured to retain a bed of litter granules;
a removable scooping device engaged with the litter channel, the removable scooping device having a sifting grate conforming to the litter channel such that upon movement of the removable scooping device through the bed of litter granules, the sifting grate is configured to retain sifted waste material;
the removable scooping device configured to be removed from the base container for disposing the retained sifted waste material from the sifting grate, whereby the scooping device can be moved through the entire bed of litter granules in one continuous motion and subsequently removed from said base container for disposal of the retained sifted waste material.

13. The litter scooping receptacle of claim 12, wherein the base container includes a landing pad adapted substantially within the perimeter of the inner sidewall, said landing pad configured to support an adult feline.

14. The litter scooping receptacle of claim 12, wherein the removable scooping device includes a handle configured to facilitate the movement of the removable scooping device by a user.

15. The litter scooping receptacle of claim 12, wherein the scooping device includes a scooping profile, a separable sifting grate, and means to attach said separable sifting grate within the perimeter of said scooping profile.

16. The litter scooping receptacle of claim 12, wherein the base container is upwardly open to an environment.

17. The litter scooping receptacle of claim 16, further comprising an enclosure cover having a singular ingress and egress opening, wherein the enclosure cover is mountable to the base container.

18. The litter scooping receptacle of claim 16, wherein the singular ingress and egress opening is upwardly open to an environment.

19. The litter scooping receptacle of claim 12, wherein the base container includes an exterior wall, said exterior wall comprising a mount slot configured to engage a mount hook on the removable scooping device such that the scooping device can be mounted to the base container in a fixed position.

20. The litter scooping receptacle of claim 12, wherein the sifting grate is comprised of a plurality of tines arranged in a pattern enabling litter granules of the bed of litter granules to pass through the sifting grate while restricting waste material.

* * * * *